Patented Aug. 9, 1938

2,126,527

UNITED STATES PATENT OFFICE 2,126,527

METHOD OF MAKING A SYNTHETIC TEA-SEED OIL

George Barsky, New York, N. Y., assignor to Wecoline Products, Inc., Boonton, N. J., a corporation of New Jersey No Drawing. Application November 24, 1936, Serial No. 112,494

2 Claims. (Cl. 260—411)

This invention relates to synthetic mixed glyceride esters and more particularly to a novel method of producing the same and to the resulting products.

The invention is particularly useful in the purification or refining of vegetable oils to adapt them for edible purposes, in which the properties of the oil are improved so as to render the same more suitable for the purpose. Methods of refining edible oils have been known and have been practiced for a considerable length of time. Usually, the procedure includes the adding to the oil of a solution of caustic alkali in slight excess of the amount sufficient to combine with the free fatty acids therein to form soaps. In the operation, the soaps mechanically carry with them foreign matter which may be in the oil, together with some of the coloring matter and some oil.

This process succeeded only in taking out some mechanical impurities and the free fatty acids. It was impossible by such a process to remove any impurities or undesirable substances present in the oil which were soluble therein. Furthermore, by this process a substantial amount of edible oil was carried along with the soap and the value thereof thus reduced. It was necessary in this process to treat oil after the operation so as to remove all excess of the alkali.

The present invention has among its objects to provide a method of chemically changing vegetable oils by which not only are mechanically held impurities and free fatty acids removed, but also certain substances of unsaponifiable nature and others which impart undesirable flavors or tastes to the oil.

In the case of certain vegetable oils, such, for example, as teaseed oil, the properties thereof are such that they are not as desirable for edible purposes as other refined oils. Teaseed oil contains certain substances, such as non-saponifiable and difficultly saponifiable matter including saponin compounds, tannic acid derivatives, alkaloidal material, and various polymerized substances and the like. Because of the presence of substances of this character, the oil is detrimentally affected and is of little value for edible purposes. It has been proposed to use such oils in conjunction with the well known edible oils, such as olive oil, cotton seed oil, and the like, by the addition of some tea seed oil or the like thereto. However, the amount of tea seed oil which could be introduced into the other oils was very small and care had to be taken so that there would not be a sufficient amount present to detrimentally affect the taste and other properties. Such additions have hitherto been considered as adulterants.

In accordance with the present invention, the vegetable oil, such as tea seed oil, is first hydrolized or saponified to form the free fatty acids. The fatty acids are then subjected to distillation with steam and usually at a low pressure under such conditions as to distill the major portion of the fatty acids, the temperature being sufficiently low so that the unsaponifiable matter remains in the still and does not contaminate the fatty acids. The latter are then esterified by means of glycerine, usually in a vacuum and at a relatively low temperature until esterification is substantially complete. The mixture of esters thus formed is then subjected to a refining operation which may consist only in a brief and moderate distillation operation to deodorize and to remove some free fatty acids which may be present due to the incompleteness of the esterification or may be subjected to the ordinary alkali refining operation followed by deodorizing in vacuum.

The following is a specific example of the operation of the present invention:

69 parts by weight of tea seed oil are mixed with 0.2% of sulphuric acid, and 0.75% of Twitchell reagent and 10–15% water. The mixture is heated with open steam coils, and after saponification is complete, as is evidenced by a test on a sample of the material and the formation of two layers, the layer of crude free fatty acids is separated from the layer of crude glycerine and the hydrolyzing agents.

The crude fatty acids are placed in a still and subjected to steam distillation at a pressure of about 15–20 mm. and at a temperature of about 240° C. Distillation is continued until approximately 59 parts by weight of refined fatty acids have been obtained. There remains in the still approximately 7 parts by weight of residue containing in addition to the various non-saponifiable matters mentioned above, which are present in the vegetable oil, a small proportion of free fatty acids. It is advisable not to conduct the distillation to such an extent as to distill over the remainder of the free fatty acids so as to avoid the danger of the simultaneous distillation of some of the other materials or decomposition products thereof.

The distilled fatty acids are then mixed with about 6 parts by weight of 95% glycerine, placed in a closed vessel and subjected to stirring. The mixture is heated to a temperature of approximately 550° F., over a period of 4 or 5 hours, the temperature gradually rising to the maximum from approximately room temperature. A vacuum is maintained throughout the operation and preferably said vacuum is from 28 to 29 inches of mercury. After the desired temperature has been attained, heating is discontinued and esterification is allowed to continue for several hours longer, say from three to four hours, until the reduction in the amount of free fatty acids approaches a minimum. Usually, the operation is completed when about 97–99% of the fatty acids are esterified.

The esterified product which contains the esters of the fatty acids originally present in the tea seed oil is of approximately the same character and consistency of the original oil with the difference that it is now free of various impurities and particularly free from certain substances of undetermined constitution and character which give a bitter or undesirable flavor to the oil. As a result of this operation, the oil thus produced, which might be termed a synthetic glyceride ester or oil, has an excellent and palatable flavor.

While the oil may be used as such, it is generally preferable to subject the same to an alkali refining operation. The oil may be subjected to a steam distillation operation at a low pressure and elevated temperature for a short time to deodorize the product. By this operation, a practically neutral oil free from objectionable odors is obtained and one which has all of the characteristics desirable in edible oils. The oil thus produced may be used without admixture with other oils as an edible product.

Although I have described my invention giving a single specific example of the operation thereof, it is quite apparent that variations in the procedure may be made without departing from the spirit of the invention. Various methods of hydrolyzing, distilling and esterifying are known and may be used in place of the specific methods herein described. Other oils may be treated in similar manner, such as cocoanut and palm oils, with equally good results. By the present invention, it is possible to start with oils which cannot be used for edible purposes and by the refining operation herein described, they may be made of sufficiently high character to be so used. These and other changes in the details of the operation of the invention may be made within the spirit thereof, and the scope of the invention is not to be limited except by the claims appended hereto.

What I claim is:

1. A method of treating teaseed oil which comprises treating about 69 parts by weight of teaseed oil with a sufficient amount of a saponifying agent to cause hydrolysis to take place to form free fatty acids, subjecting the product to steam distillation at a low pressure to distill over about 59 parts of refined fatty acids, treating the distillate with about 6 parts of 95% glycerine to esterify said refined acids.

2. A method of treating teaseed oil which comprises hydrolizing said oil to form free fatty acids, separating the same from glycerine and distilling to recover substantially all of the mixture of fatty acids originally present in said oil, the conditions of distillation being such that unsaponifiable and difficultly saponifiable matter are not volatilized, and esterifying the distilled mixture with glycerine to re-form substantially the original oil.

GEORGE BARSKY.